United States Patent

[11] 3,609,145

[72] Inventor: Robert B. Moffett
Kalamazoo, Mich.
[21] Appl. No.: 790,441
[22] Filed: Jan. 10, 1969
[45] Patented: Sept. 28, 1971
[73] Assignee: The Upjohn Company
Kalamazoo, Mich.

[54] 1H-1,4-BENZODIAZEPINE-1-SULFONAMIDES
3 Claims, No Drawings
[52] U.S. Cl. .................................... 260/239.3 D,
260/307 H, 260/556 B, 260/570 A, 424/244
[51] Int. Cl. .......................................... C07d 53/06
[50] Field of Search .................................... 260/239
BD, 239.3 BD

[56] References Cited
UNITED STATES PATENTS
3,136,815  6/1964  Reeder et al. ............... 260/239.3
3,352,877  11/1967  Den Hollander ............ 260/239
3,458,501  7/1969  Bell et al. .................... 260/239.3

Primary Examiner—Henry R. Jiles
Assistant Examiner—Robert T. Bond
Attorneys—Eugene O. Retter and John Kekich ABSTRACT: Novel 1H-1,4-benzodiazepine sulfonamides of the formula:

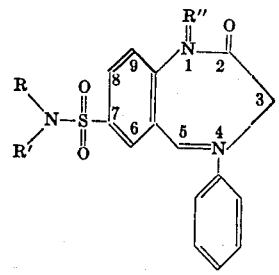

VI wherein R, R' and R" are selected from the group consisting of hydrogen and alkyl of 1 to 4 carbon atoms, inclusive, are prepared from p-nitrobenzenesulfonamide and its N-alkylated derivatives by (1) condensation with phenylacetonitrile, (2) catalytic hydrogenation, and (3) condensation with ethyl glycinate hydrochloride. The novel products of above formula VI having central nervous depressant and antibacterial activity are useful to tranquilize mammals, e.g., animals during shipping, and are administered in oral or injectable forms.

1H-1,4-BENZODIAZEPINE-1-SULFONAMIDES

BACKGROUND OF THE INVENTION

Field of the Invention

This invention relates to novel organic compounds and is more particularly concerned with 1H-1,4-benzodiazepine-7-sulfonamides, and the process of production thereof.

SUMMARY OF THE INVENTION

The novel compounds and the process of this invention can be illustratively represented by the following sequence of formulas:

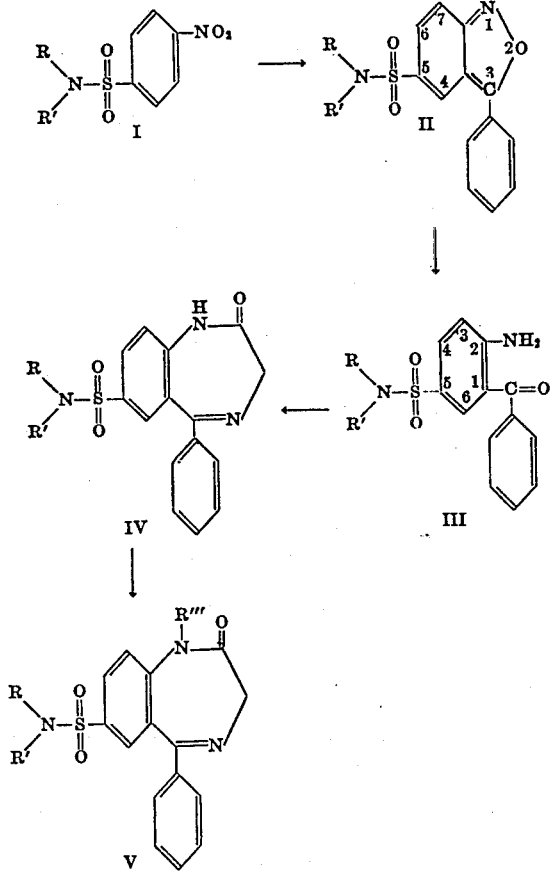

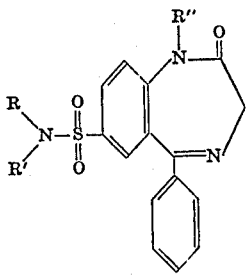

wherein R and R' are selected from the group consisting of hydrogen and alkyl of one to four carbon atoms, inclusive, and R''' is alkyl defined as above.

The compounds of the invention have therefore the structure VI:

in which R, R' and R'' are selected from the group consisting of hydrogen and alkyl of one to four carbon atoms, inclusive.

The alkyl groups herein considered for the compounds of structure VI are methyl, ethyl, propyl isopropyl, butyl, isobutyl and the like.

The process of this invention comprises: (1) condensing a p-nitrobenzenesulfonamide I with phenylacetonitrile in the presence of a base to give a 3-phenyl-2,1-benzisoxazole-5-sulfonamide II; catalytically hydrogenating II to obtain the corresponding 2-amino-5-sulfamoylbenzophenone III, condensing the benzophenone III with ethyl glycinate to obtain the corresponding 2H-1,4-benzodiazepin-2-one IV, and if desired, alkylating IV with alkyl halides or dialkyl sulfates to obtain the corresponding trialkyl 2H-1,4-benzodiazepin-2-one.

In the event that a compound of formula VI is desired in which R and R' are hydrogen and R'' is alkyl, a modified procedure must be used, e.g., treating a 2-chloro-5-chlorosulfonylbenzophenone VII with ammonia at room temperature to obtain compound VIII, and then with alkylamine at 200°-300° C. in an autoclave for 2 to 4 hours to obtain 2-alkylamino-5 sulfamoylbenzophenone IX which can be converted to the compound Va below, in which R''' is alkyl defined as above The reaction can be illustratively represented as follows:

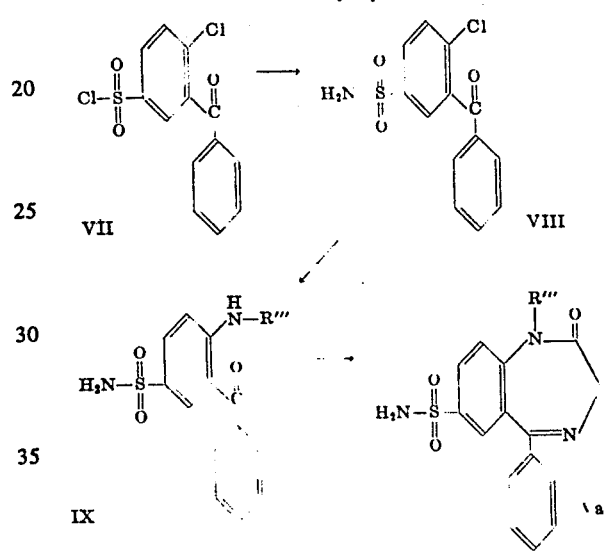

wherein R''' is as defined above

The novel products of formula VI have central nervous system depressant activity in dosages of 5-150 mg./kg. and act as good tranquilizers, sedatives and anticonvulsants.

For example, a dosage of 18 mg./kg. of body weight of 1,3-dihydro-5-phenyl-7-(dimethylsulfamoyl)-2H-1,4-benzodiazepin-2-one in mice causes half the mice to remain in a Petri dish for longer than 3 minutes ("dish test" indicating tranquilization) In the chimney test, the effective dosage ($ED_{50}$) for half the animals is 63 mg./kg. and in the pedestal test the $ED_{50}$ is 8.9 mg./kg The $LD_{50}$, on the other hand, for this compound is more than 1,000 mg./kg. The compound 1,3 dihydro-5-phenyl-7-sulfamoyl-2H-1,4-benzodiazepin-2-one is also active in these tests, but at a lower level: Chimney test $ED_{50}$ 112 mg./kg., Dish test $ED_{50}$ 142 mg./kg.

These compounds of formula VI can, therefore, be used in birds and mammals when needed, e.g., for minor veterinary operations, tranquilization during transport of animals by airplane, ship, train, truck and so on Administration to cattle horses, dogs, cats or the like, or zoo animals on long voyages in a quantity between 5 to 150 mg./kg. of body weight produces sedation and tranquilization and thereby reduces losses of valuable animals due to overexcitement and fighting among caged animals.

The novel compounds of formula VI can be administered to mammals and birds by both oral and parenteral routes in order to produce their pharmacological effects. For oral administration, unit dosage forms such as tablets, capsules, powders, granules, syrups, elixirs and the like containing the appropriate amount for treatment are used. For tablets, common pharmaceutical carriers such as starch, lactose, kaolin, dicalcium phosphate and the like are employed. Powders may also be used in gelatin capsules with or without carriers such as methylcellulose, magnesium stearate, calcium stearate, talc and the like. For fluid preparation, these compounds may be dissolved or suspended in aqueous alcoholic vehicles with or without buffering agents and with flavoring mixtures.

The starting materials of this invention are well known and reported in the literature.

In carrying out the process of the present invention, p-nitrobenzenesulfonamide, dissolved in a lower alkanol, is treated with a solution of phenylacetonitrile and an alkali metal hydroxide in an organic solvent. The solvents for this reaction are generally alkanols, such as methanol, ethanol, propanol and isopropyl alcohol. The reactants, p-nitrobenzenesulfonamide and phenylacetonitrile, are usually in a ratio of 1:1 to 1:1.2, that is, a slight excess of the phenylacetonitrile. A large excess is used of the base which may be potassium hydroxide or sodium hydroxide. The temperature of the reaction mixture is kept generally between -10° and 30° C. In the preferred embodiment of this invention, the solution containing the p-nitrobenzenesulfonamide is added slowly to the solution containing the potassium hydroxide and the phenylacetonitrile. After stirring for 1 to 6 hours, the reaction mixture is allowed to warm to near room temperature and after recooling, is treated with an excess of cold water, having an initial temperature between 10°-20° C. After stirring for one-half to 4 hours at room temperature, the reaction mixture is filtered and from the filtrate, the desired 3-phenyl-2,1-benzisoxazole-5-sulfonamide is obtained. The isolation of the material from the reaction mixture requires that the pH is lowered to about 8 or 9 by the addition of an acid such as acetic acid, while keeping the temperature at about room temperature. The solid which then appears is purified by conventional means, such as extraction of impurities, recrystallization, chromatography and the like.

The thus-obtained 3-phenyl-2,1-benzisoxazole-5-sulfonamide is catalytically hydrogenated under conventional conditions, such as a hydrogen pressure between 20-60 lbs. p.s.i., in an inert organic solvent, preferably methanol or ethanol, with dimethylformamide added, at temperatures between 15°-35° C in the presence of from 1%-5% of catalyst, suitably a palladium or platinum catalyst. Under those conditions, the reaction period is between 2 to 6 hours. The termination of the reaction can be determined by the consumption of hydrogen. After termination of the reaction, the product is isolated and purified in conventional manner, that is elimination of the catalyst by filtration, evaporation of the filtrate and crystallization and recrystallization of the residue from organic solvents such as ethanol, methanol, ether or the like.

The thus-obtained 2-amino-5-sulfamoylbenzophenone is then condensed with ethyl glycinate in an organic solvent. The reaction is generally carried out with an excess of 2 to 10 molar equivalents of ethyl glycinate per molar equivalent of the 2-amino-5-sulfamoylbenzophenone. In the preferred embodiment of this invention, the reaction is carried out with ethyl glycinate hydrochloride in pyridine or alkylated pyridine at a temperature between 50° C. and the refluxing temperature of the mixture. The reaction period, depending on the temperature chosen, is between 12 and 72 hours. After termination of the reaction the product is isolated and purified by conventional means such as evaporation, extraction, crystallization, recrystallization, chromatography and combinations of these methods, or the like. The product, 1,3-dihydro-5-phenyl-7-sulfamoyl-2H-1,4-benzodiazepin-2-one is thus obtained in crystalline form.

The same reaction can be carried out with a starting compound in which the amino radical is substituted with alkyl, such as a p-nitrobenzene-N,N-dialkylsulfonamide or with an intermediate 3-phenyl-2,1-benzisoxazole-5-sulfonamide compound. These compounds can be prepared by reacting 3-phenyl-2,1-benzisoxazole-5-sulfonamide or p-nitrobenzenesulfonamide with an alkylating agent such as dimethyl sulfate, diethyl sulfate, alkyl iodide or alkyl bromide in a basic solution. In the preferred embodiment of this invention, compound I or compound II in a methanol or ethanol solution and in the presence of a base, preferably sodium or potassium hydroxide in a quantity to keep the pH approximately at 11 or higher is added. To this mixture, the alkylating reagent is added dropwise, while additional quantities of base are added to keep the alkalinity at all times above pH 11. The pH of the reaction mixture is determined by either taking aliquot samples and measuring electrically the pH, or simpler, by the addition of a suitable indicator. The reaction is carried out at about reflux of the mixture during a period of one-half to 2 hours. The product is obtained by diluting the reaction mixture with excess ice water, collecting the crude product and, if desired, purifying it before further reaction.

If a compound of formula V is desired in which, in addition to R and R', R''' is also alkyl, a compound of the formula IV in which R and R' are alkyl, is treated with additional alkylating reagents, e.g., with dialkyl sulfate or alkyl iodide or bromide in the presence of an alkali base as described before.

The following examples are illustrative of the process and products of the present invention, but are not to be construed as limiting.

Example 1  3-Phenyl-2,1-benzisoxazole-5-sulfonamide

A solution of 1.1 kg. (16.3 moles) of 85% potassium hydroxide in 2.1 l. of methanol in a 12 l. flask was cooled to 0° C. by an ice-salt bath and 113.4 g. (0.97 mole) of phenylacetonitrile was added with stirring. A solution of 178.5 g. (0.883 mole) of p-nitrobenzenesulfonamide (kept in solution by warming) in 2.1 l. of methanol was slowly added at 0°±5° C. during 1 hour. After stirring at 0°±5° C. for 4 hours more the dark purple solution was allowed to warm to 18° C. overnight. It was then recooled with an ice bath and 5.6 l. of water was slowly added at 10°-20° C. After stirring for 2 hours at room temperature, the mixture was filtered to remove solid. The aqueous filtrate was adjusted to pH about 8.4 by adding about 900 ml. of acetic acid at 20°-25° C. The resulting solid was collected, washed with water and dried, giving 118.6 g. of brown solid. This solid was boiled with 3 l. of methanol, cooled and filtered, yielding 72.0 g. of tan solid, melting point 236°-237.5° C. Concentration of the filtrate gave 11.5 g. more light brown solid, melting point 234°-235.5° C. The total yield was 83.5 g. (34.5%). A sample was recrystallized from ethyl acetate giving tan needles of 3-phenyl-2,1-benzisoxazole-5-sulfonamide, melting point 235°-238° C.

Anal. Calcd. for $C_{13}H_{10}N_2O_3S$:  C, 56.93; H, 3.68; N, 10.21; S, 11.68
Found:  C, 57.21; H, 3.63; N, 10.49; S, 11.65.

Example 2  2-Amino-5-sulfamoylbenzophenone

A solution of 27.5 g. (7 mole) of 3-phenyl-2,1-benzisoxazole-5-sulfonamide in 150 ml. of dimethylformamide and 100 ml. of absolute ethanol was hydrogenated in the presence of 1 g. of 10% palladium-on-charcoal catalyst at 3.5 kg./cm.² starting pressure and room temperature (24° to 26° C.). The resulting solution was filtered and evaporated to dryness in vacuo on a steam bath, giving 35 g. of olive colored crystalline residue. This was refluxed with 400 ml. of absolute ethanol and cooled to 2° C., giving 23.2 g. (84%) of yellow crystals of 2-amino-5-sulfamoylbenzophenone of melting point 197°-199° C. A sample for analysis was recrystallized from absolute ethanol (9 g. in 200 ml.), giving yellow crystals of 2-amino-5-sulfamoylbenzophenone of melting point 197.5°-199° C.

Anal. Calcd. for $C_{13}H_{12}N_2O_3S$:  C, 56.51; H, 4.38; N, 10.14; S, 11.60
Found:  C, 56.64; H, 4.37; N, 10.43; S, 11.68

Example 3  1,3-Dihydro-5-phenyl-7-sulfamoyl-2H-1,4-benzodiazepin-2-one (alternate name 2,3-dihydro-2-oxo-5-phenyl-1H-1,4-benzodiazepine-7-sulfonamide)

A solution of 2.76 g. (0.01 mole) of 2-amino-5-sulfamoylbenzophenone and 4.19 g. (0.03 mole) of ethyl glycinate hydrochloride in 50 ml. of dry pyridine was stirred under reflux for 20 hours. The dark solution was evaporated to dryness in vacuo and 2.8 g. (0.02 mole) of ethyl glycinate hydrochloride, 50 ml. of pyridine and 2 ml. of piperidine were added. The solution was then refluxed for 23.5 hours. The solvent was evaporated in vacuo on a steam bath and the dark residue was well shaken with ether and water. The solid, insoluble in both layers was collected, washed (water and ether)

and dried, giving 2.25 g. of gray crystalline solid. This solid was boiled with 20 ml. of methyl ethyl ketone, cooled to room temperature, and filtered, giving 1.34 g. of gray solid of melting point 272°–274° C. (dec.). This solid was dissolved in 100 ml. of methanol, treated with activated charcoal (Darco G-60) at boiling point and filtered. The nearly colorless solution was concentrated to 35 ml. and cooled, giving 1.0 g. (31.8%) of white crystalline solid, melting point 287°–288° C. (dec.). Another run gave crystals of 1,3-dihydro-5-phenyl-7-sulfamoyl-2H-1,4-benzodiazepin-2-one of melting point 289°–291° C.

Anal. Calcd. for $C_{15}H_{13}N_3O_3S$:  C, 57.13; H, 4.15; N, 13.32; S, 10.17.
Found  C, 57.32; H, 4.24; N, 13.51; S, 10.23.

Example 4  N,N-dimethyl-3-phenyl-2,1-benzisoxazole-5-sulfonamide

A mixture of 27.4 g. (0.1 mole) of 3-phenyl-2,1-benzisoxazole-5-sulfonamide, 500 ml. of methanol, and 1 ml. of thymolphthalein test solution was placed in a 2-l. flask fitted with a stirrer, reflux condenser, and two dropping funnels. In one dropping funnel was placed 97 ml. (126 g.; 1 mole) of dimethyl sulfate and in the other, 200 ml. of 5.32N (20%) aqueous sodium hydroxide. The flask was heated to reflux on a steam bath and 25 ml. of the sodium hydroxide solution was added, dissolving all the solid. Dimethyl sulfate was added dropwise during 1 hour and the remaining sodium hydroxide solution was added in 25-ml. portions as required to keep the solution strongly basic. A yellow solid soon separated. After the complete addition of the reagents, the mixture was stirred under reflux for one-half hour and about half the solvent was removed *in vacuo*. The mixture was diluted to 2 l. with ice water, filtered, the resulting product was collected, washed with water and dried, giving 29.6 g. (99%) of yellow solid, N,N-dimethyl-3-phenyl-2,1-benzisoxazole-5-sulfonamide of melting point 167.5°–170° C.

Material from another run was recrystallized from 2-propanol, to give the above 5-sulfonamide of melting point 168°–170° C.

Anal. Calcd. for $C_{15}H_{14}N_2O_3S$:  C, 59.59; N, 4.67; N, 9.26; S, 10.60.
Found:  C, 59.70; H, 4.54; N, 9.04; S, 10.68

In other runs methyl iodide was used in place of dimethyl sulfate.

Example 5  N,N-diethyl-3-phenyl-2,1-benzisoxazole-5-sulfonamide

In the manner given in example 4, by treating 3-phenyl-2,1-benzisoxazole-5-sulfonamide with ethyl iodide in a strong basic solution (sodium hydroxide), N,N-diethyl-3-phenyl-2,1-benzisoxazole-5-sulfonamide can be obtained.

Example 6  N,N-dipropyl-3-phenyl-2,1-benzisoxazole-5-sulfonamide

In the manner given in example 4, by treating 3-phenyl-2,1-benzisoxazole-5-sulfonamide with propyl iodide in a strong basic solution (sodium hydroxide), N,N-dipropyl-3-phenyl-2,1-benzisoxazole-5-sulfonamide can be obtained.

Example 7  N,N-dibutyl-3-phenyl-2,1-benzisoxazole-5-sulfonamide

In the manner given in example 4, by treating 3-phenyl-2,1-benzisoxazole-5-sulfonamide with butyl bromide in a strong basic solution (sodium hydroxide), N,N-dibutyl-3-phenyl-2,1-benzisoxazole-5-sulfonamide can be obtained.

Example 8  N,N-diisopropyl-3-phenyl-2,1-benzisoxazole-5-sulfonamide

In the manner given in example 4, by treating 3-phenyl-2,1-benzisoxazole-5-sulfonamide with isopropyl iodide in a strong basic solution (sodium hydroxide), N,N-diisopropyl-3-phenyl-2,1-benzisoxazole-5-sulfonamide can be obtained.

Example 9  N,N-diisobutyl-3-phenyl-2,1-benzisoxazole-5-sulfonamide

In the manner given in example 4, by treating 3-phenyl-2,1-benzisoxazole-5-sulfonamide with isobutyl iodide in a strong basic solution (potassium hydroxide), N,N-diisobutyl-3-phenyl-2,1-benzisoxazole-5-sulfonamide can be obtained.

Example 10  2-Amino-5-(dimethylsulfamoyl)benzophenone

A mixture of 15.12 g. (0.05 mole) of N,N-dimethyl-3-phenyl-2,1-benzisoxazole-5-sulfonamide and 200 ml. of dioxane was hydrogenated in the presence of 0.5 g. of platinum oxide catalyst at 3.5 kg./cm.² at room temperature. The solid soon dissolved, the theoretical amount of hydrogen was absorbed in 25 min. and the uptake practically stopped. After filtration, the solution was evaporated *in vacuo* to about 75 ml. and diluted with 200 ml. of ethanol at the boiling point. On cooling, the product crystallized giving 12.07 g. of light tan crystals of 2-amino-5-(dimethylsulfamoyl)benzophenone of melting point 203.5°–205° C. An additional 1.9 g., melting point 198°–203.5° C., was obtained from the filtrate. The total yield was 92%.

Anal. Calcd. for $C_{15}H_{16}N_2O_3S$:  C, 59.19; H, 5.30; N, 9.20; S, 10.53.
Found:  C, 59.26; H, 5.43 N, 9.09; S, 10.47

Example 11  2-Amino-5-(diethylsulfamoyl)benzophenone

In the manner given in example 10, by hydrogenating N,N-diethyl-3-phenyl-2,1-benzisoxazole-5-sulfonamide with a platinum oxide catalyst in dioxane, 2-amino-5-(diethylsulfamoyl)benzophenone can be obtained.

Example 12  2-Amino-5-(dipropylsulfamoyl)benzophenone

In the manner given in example 10, by hydrogenating N,N-dipropyl-3-phenyl-2,1-benzisoxazole-5-sulfonamide with a platinum oxide catalyst in dioxane, 2-amino-5-(dipropylsulfamoyl)benzophenone can be obtained.

Example 13  2-Amino-5-(dibutylsulfamoyl)benzophenone

In the manner given in example 10, by hydrogenating N,N-dibutyl-3-phenyl-2,1-benzisoxazole-5-sulfonamide with a platinum oxide catalyst in dioxane, 2-amino-5-(dibutylsulfamoyl)benzophenone can be obtained.

Example 14  2-Amino-5-(diisopropylsulfamoyl)benzophenone

In the manner given in example 10, by hydrogenating N,N-diisopropyl-3-phenyl-2,1-benzisoxazole-5-sulfonamide with a platinum oxide catalyst in dioxane, 2-amino-5-(diisopropylsulfamoyl)benzophenone can be obtained.

Example 15  2-Amino-5-(diisobutylsulfamoyl)benzophenone

In the manner given in example 10, by hydrogenating N,N-diisobutyl-3-phenyl-2,1-benzisoxazole-5-sulfonamide with a platinum oxide catalyst in dioxane, 2-amino-5-(diisobutylsulfamoyl)benzophenone can be obtained.

Example 16  2,3-Dihydro-N,N-dimethyl-2-oxo-5-phenyl-1H-1,4-benzodizepine-7-sulfonamide [alternate name 1,3-dihydro-5 -phenyl-7-(dimethylsulfamoyl)-2H-1,4-benzodiazepin-2-one]

A mixture of 6.08 g. (0.02 mole) of 2-amino-5-(dimethylsulfamoyl)benzophenone and 8.38 g. (0.08 mole) of ethyl glycinate hydrochloride in 100 ml. of dry pyridine and 2 ml. of piperidine was stirred under reflux for 6.5 hours. Most of the solvent was evaporated *in vacuo* on a steam bath and thereupon was added 100 ml. of pyridine, 2 ml. of piperidine and 5.6 g. (0.04 mole) of ethyl glycinate hydrochloride. The dark solution was refluxed for an additional 20.5 hours and evaporated *in vacuo*. The residue was treated with water and extracted with methylene chloride. The methylene chloride solution was washed with dilute acetic acid and then with water and was well extracted with aqueous sodium hydroxide solution. Evaporation of the methylene chloride gave a gummy solid which was chromatographed on 60 g. of silica and diluted with 1 l. of 10% acetone-90% benzene (by volume) in 50-ml. portions. Fractions 3 to 18 were combined and recrystallized from 350 ml. of absolute ethanol, giving 2.07 g. (34%) of recovered starting material 2-amino-5-(dimethylsulfamoyl)benzophenone. The elution of the column was continued with 500 ml. of 50% acetone-50% benzene (by volume) in 50-ml. portions, giving about 0.9 g. of crude product. The aqueous sodium hydroxide solution extract above was acidified with acetic acid, giving 2.17 g. of a gray solid, which was combined with the second fraction from the column and rechromatographed on 150 g. of silica. Elution with ten 50-ml. fractions of 10% acetone-50% benzene (by volume) and then with ten 50-ml. fractions of 50% acetone-50% benzene (by volume) gave first a fraction of impure starting material and then (fractions (16–19 inclusive) the desired product. This was recrystallized from 100 ml. of 2-propanol, yielding 2.1 g. (30.6%) of nearly white crystals of 2,3-dihydro-N,N-dimethyl-2-oxo-5-phenyl-1H-1,4-benzodiazepine-7-sulfonamide of melting point 224°–226° C. Similar material from another run had a melting point of 226°–227° C.

Anal. Calcd. for $C_{17}H_{17}N_3O_3S$:

|  | C, 59.46; H, 4.99; |
|---|---|
|  | N, 12.24; S, 9.34 |
| Found: | C, 59.52; H, 5.07; |
|  | N, 12.19; S, 9.34. |

Example 17  2,3-Dihydro-N,N-diethyl-2-oxo-5-phenyl-1H-1,4-benzodiazepine-7-sulfonamide In the manner given in example 16, heating 2-amino-5-(diethylsulfamoyl)benzophenone with ethyl glycinate hydrochloride in pyridine solution can give 2,3-dihydro-N,N-diethyl-2-oxo-5-phenyl-1H-1,4-benzodiazepine-7-sulfonamide.

Example 18  2,3-dihydro-N,N-dipropyl-2-oxo-5-phenyl-1H-1,4-benzodiazepine-7-sulfonamide In the manner given in example 16, heating 2-amino-5-(dipropylsulfamoyl)benzophenone with ethyl glycinate hydrochloride in pyridine solution can give 2,3-dihydro-N,N-dipropyl-2-oxo-5-phenyl-1H-1,4-benzodiazepine-7-sulfonamide.

Example 19  2,3-Dihydro-N,N-dibutyl-2-oxo-5-phenyl-1H-1,4-benzodiazepine-7-sulfonamide In the manner given in example 16, heating 2-amino-5-(dibutylsulfamoyl)benzophenone with ethyl glycinate hydrochloride in pyridine solution can give 2,3-dihydro-N,N-dibutyl-2-oxo-5-phenyl-1H-1,4-benzodiazepine-7-sulfonamide.

Example 20  2,3-Dihydro-N,N-diisopropyl-2-oxo-5-phenyl-1H-1,4-benzodiazepine-7-sulfonamide In the manner given in example 16, heating 2-amino-5-(diisopropylsulfamoyl)enzophenone with ethyl glycinate hydrochloride in pyridine solution can give 2,3-dihydro-N,N-diisopropyl-2-oxo-5-phenyl-1H-1,4-benzodiazepine-7-sulfonamide.

Example 21  2,3-Dihydro-N,N-diisobutyl-2-oxo-5-phenyl-1H-1,4-benzodiazepine-7-sulfonamide In the manner given in example 16, heating 2-amino-5-(diisobutylsulfamoyl)benzophenone with ethyl glycinate hydrochloride in pyridine solution can give 2,3-dihydro-N,N-diisobutyl-2-oxo-5-phenyl-1H-1,4-benzodiazepine-7-sulfonamide.

Example 22  1,3-Dihydro-1-methyl-7-(dimethylsulfamoyl)-2H-1,4-benzodiazepin-2-one Heating to reflux a mixture of 1,3-dihydro-5-phenyl-7-sulfamoyl-2H-1,4-benzodiazepin-2-one (example 3) in methanol and adding dropwise a solution of aqueous sodium hydroxide and separately dimethyl sulfate can give 1,3-dihydro-1-methyl-7-(dimethylsulfamoyl)-2H-1,4-benzodiazepin-2-one.

Example 23  1,3-Dihydro-1-ethyl-7-(diethylsulfamoyl)-2H-1,4-benzodiazepin-2-one

Heating to reflux a mixture of 1,3-dihydro-5-phenyl-7-sulfamoyl-2H-1,4-benzodiazepin-2-one in methanol and adding dropwise a solution of aqueous sodium hydroxide and separately diethyl sulfate can give 1,3-dihydro-1-ethyl-7-(diethylsulfamoyl)-2H-1,4-benzodiazepin-2-one.

Example 24  1,3-Dihydro-1-propyl-7-(dipropylsulfamoyl)-2H-1,4-benzodiazepin-2-one Heating to reflux a mixture of 1,3-dihydro-5-phenyl-7-sulfamoyl-2H-1,4-benzodiazepin-2-one in methanol and adding dropwise a solution of aqueous sodium hydroxide and separately dipropyl sulfate can give 1,3-dihydro-1-propyl-7-(dipropylsulfamoyl)-2H-1,4-benzodiazepin-2-one.

Example 25  1,3-Dihydro-1-butyl-7-(dibutylsulfamoyl)-2H-1,4-benzodiazepin-2-one

Heating to reflux a mixture of 1,3-dihydro-5-phenyl-7-sulfamoyl-2H-1,4-benzodiazepin-2-one in methanol and adding dropwise a solution of aqueous sodium hydroxide and separately dibutyl sulfate can give 1,3-dihydro-1-butyl-7-(dibutylsulfamoyl)-2H-1,4-benzodiazepin-2-one.

Example 26  1,3-Dihydro-1-isopropyl-7-(diisopropylsulfamoyl)-2H-1,4-benzodiazepin-2-one Heating to reflux a mixture of 1,3-dihydro-5-phenyl-7-sulfamoyl-2H-1,4-benzodiazepin-2-one in methanol and adding dropwise a solution of aqueous sodium hydroxide and separately diisopropyl sulfate can give 1,3-dihydro-1-isopropyl-7-(diisopropylsulfamoyl)-2H-1,4-benzodiazepin-2-one.

Example 27  1,3-Dihydro-1-isobutyl-7-(diisobutylsulfamoyl)-2H-1,4-benzodiazepin-2-one Heating to reflux a mixture of 1,3-dihydro-5-phenyl-7-sulfamoyl-2H-1,4-benzodiazepin-2-one in methanol and adding dropwise a solution of aqueous sodium hydroxide and separately diisobutyl sulfate can give 1,3-dihydro-1-isobutyl-7-(diisobutylsulfamoyl)-2H-1,4-benzodiazepin-2-one.

Example 28  1,3-Dihydro-1-methyl-5-phenyl-7-sulfamoyl-2H-1,4-benzodiazepin-2-one A. 2-Chloro-5-aminobenzophenone and its methanesulfonate A mixture of 2.61 g. (0.01 mole) of 2-chloro-5-nitrobenzophenone, 0.1 g. of platinum oxide in 150 ml. of ethanol was hydrogenated at 3.5 kg./cm.² pressure and 23°–25° C. for 5 minutes. The catalyst was removed by filtration of the reaction mixture and the filtrate concentrated in vacuo giving a yellow oil which was dissolved in cold dilute hydrochloric acid and washed once with ether. The acidic aqueous solution was basified with cold dilute aqueous sodium hydroxide and the resulting oil was well extracted with ether and dried over anhydrous magnesium sulfate. Filtration and concentration of the ether in vacuo gave an oil which was dissolved in ether and acidified with methanesulfonic acid to give 2.43 g. of white crystals, melting point of 198°–201° C. Two crystallizations, once from 2-propanol and once from ethanol gave 0.90 g. of 2-chloro-5-aminobenzophenone methanesulfonate (27.5%) of melting point 210°–212° C. (dec.)

Anal. Calcd. for $C_{14}H_{14}ClNO_4S$:

|  | C, 51.30; H, 4.30; |
|---|---|
|  | N, 4.27; Cl 10.82; |
|  | S, 9.78. |
| Found: | C, 51.45; H, 4.18; |
|  | N, 4.53; Cl 10.69; |
|  | S, 9.73. |

Treatment of the methanesulfonate with the calculated amount of sodium hydroxide in water, extraction with ether and concentration of the ether can give pure 2-chloro-5-aminobenzophenone.

B. 3-Benzoyl-4-chlorobenzenesulfonyl chloride (2-Chloro-5-chlorosulfonylbenzophenone)

To a cold solution (0°–5° C.) of 23.8 g. (0.073 mole) of 2-chloro-5-aminobenzophenone, in 73 ml. of acetic acid and 25 ml. of concentrated hydrochloric acid was added slowly 5.58 g. (0.685 mole) of sodium nitrite in 9.5 ml. of water. This mixture was stirred for one-half hour at 0°–5° C. Then 17.3 g. (0.27 mole) of sulfur dioxide in 51 ml. of acetic acid containing 2.9 g. (0.017 mole) of cupric chloride in 5.2 ml. of water was added. This mixture was allowed to warm to room temperature with stirring over the course of 1 hour and then poured into ice water. The solid was collected to give 21.27 g. (92.5%) of pale yellow solid of 3-benzoyl-4-chlorobenzenesulfonyl chloride of melting point 86.5°–89° C.; recrystallized from methylcyclohexane, the melting point was 90.5°–92° C.

Anal. Calcd. for C₁₃H₈Cl₂O₃S:  C, 49.54; H, 2.56; Cl, 22.50; S, 10.18.
Found:  C, 49.47; H, 2.62; Cl, 22.27; S, 9.97.

C. 2-Chloro-5-sulfamoylbenzophenone

Treating in an autoclave, at room temperature (22°–26° C.) a solution of 2-chloro-5-chlorosulfonylbenzophenone in methanol with excess ammonia at 25–35 p.s.i. pressure can yield 2-chloro-5-sulfamoylbenzophenone.

D. 2-Methylamino-5-sulfamoylbenzophenone

Treating the thus-obtained 2-chloro-5-sulfamoyl-benzophenone with methylamine at 250°–300° C. for about 3 to 4 hours can yield 2-methylamino-5-sulfamoyl-benzophenone.

E. 1,3-Dihydro-1-methyl-5-phenyl-7-sulfamoyl-2H-1,4-benzodiazepin-2-one

Condensing the thus-obtained 2-methylamino-5sulfamoyl-benzophenone with ethyl glycinate hydrochloride in pyridine (as in Example 3) can yield 1,3-dihydro-1-methyl-5-phenyl-7-sulfamoyl-2H-1,4-benzodiazepin-2-one.

Example 29 1,3-Dihydro-1-ethyl-5-phenyl-7-sulfamoyl-2H-1,4-benzodiazepin-2-one

A. 2-Ethylamino-5-sulfamoylbenzophenone

Treating 2-chloro-5-sulfamoylbenzophenone (example 28D) with ethylamine at 250°–300° C. for about 3 to 4 hours can yield 2-ethylamino-5-sulfamoylbenzophenone.

B. 1,3-Dihydro-1-ethyl-5-phenyl-7-sulfamoyl-2H-1,4-benzodiazepin-2-one

In the manner given in example 3, heating to reflux 2-ethylamino-5-sulfamoylbenzophenone in pyridine solution with ethyl glycinate hydrochloride can give 1,3-dihydro-1-ethyl-5-phenyl-7sulfamoyl-2H-1,4-benzodiazepin-2-one.

In the manner given in example 28, but substituting propyl, isopropyl, butyl, isobutylamine for the methylamine of example 28D, can provide other 1-substituted benzodiazepinones such as:

1,3-dihydro-1-propyl-5-phenyl-7-sulfamoyl-2H-1,4-benzodiazepin-2-one;

1,3-dihydro-1-isopropyl-5-phenyl-7-sulfamoyl-2H-1,4-benzodiazepin-2-one; 1,3-dihydro-1-butyl-5-phenyl-7-sulfamoyl-2H-1,4-benzodiazepin-2-one;

1,3-dihydro-1-isobutyl-5-phenyl-7-sulfamoyl-2H-1,4-benzodiazepin-2-one; and the like.

Example 30 1,3-Dihydro-1-methyl-5-phenyl-7-(ethylsulfamoyl)-2H-1,4-benzodiazepin-2-one Heating to reflux a mixture of one molar equivalent of 1,3-dihydro-1-methyl-5-phenyl-7-sulfamoyl-2H-1,4-benzodiazepin-2-one in methanol and adding dropwise aqueous sodium hydroxide and separately ethyl iodide (1.15 molar equivalents), can provide 1,3-dihydro-1-methyl-5-phenyl-7-(ethylsulfamoyl)-2H-1,4-benzodiazepin-2-one.

Following the procedure of example 30, but replacing ethyl iodide with methyl, propyl, isopropyl, butyl, isobutyl iodide or bromide can give:

1,3-dihydro-1-methyl-5-phenyl-7-(methylsulfamoyl)-2H-1,4-benzodiazepin-2-one;

1,3-dihydro-1-methyl-5-phenyl-7-(propylsulfamoyl)-2H-1,4-benzodiazepin-2-one;

1,3-dihydro-1-methyl-5-phenyl-7-(isopropylsulfamoyl)-2H-1,4-benzodiazepin-2-one;

1,3-dihydro-1-methyl-5-phenyl-7-(butylsulfamoyl)-2H-1,4-benzodiazepin-2-one;

1,3-dihydro-1-methyl-5-phenyl-7-(isobutylsulfamoyl)-2H-1,4-benzodiazepin-2-one; and the like.

By using in the procedure of example 30 a starting material having in the 1-position an alkyl substituent other than methyl, such as the compound of example 29 and like 1-alkyl compounds, and halides such as methyl, ethyl, propyl, isopropyl, butyl and isobutyl iodides and bromides, mixed dialkyl substituted products can be prepared such as:

1,3-dihydro-1-ethyl-5-phenyl-7-(methylsulfamoyl)-2H-1,4-benzodiazepin-2-one;

1,3-dihydro-1-propyl-5-phenyl-7-(methylsulfamoyl)-2H-1,4-benzodiazepin-2-one;

1,3-dihydro-1-butyl-5-phenyl-7-(methylsulfamoyl)-2H-1,4-benzodiazepin-2-one;

1,3-dihydro-1-isobutyl-5-phenyl-7-(methylsulfamoyl)-2H-1,4-benzodiazepin-2-one;

1,3-dihydro-1-isopropyl-5-phenyl-7-(ethylsulfamoyl)-2H-1,4-benzodiazepin-2-one;

1,3-dihydro-1-butyl-5-phenyl-7-(propylsulfamoyl)-2H-1,4-benzodiazepin-2-one;

1,3-dihydro-1-ethyl-5-phenyl-7-(butylsulfamoyl)-2H-1,4-benzodiazepin-2-one;

1,3-dihydro-1-ethyl-5-phenyl-7-(isopropylsulfamoyl)-2H-1,4-benzodiazepin-2-one;

1,3-dihydro-1-propyl-5-phenyl-7-(isobutylsulfamoyl)-2H-1,4-benzodiazepin-2-one; and the like.

Such dialkylated products can be converted to trialkyl products by reaction with additional alkyl halides and a base such as sodium or potassium hydroxide; e.g., Example 31 1,3-Dihydro-1-methyl-5-phenyl-7-(ethylpropylsulfamoyl)-2H-1,4-benzodiazepin-2-one Heating to reflux a mixture of one molar equivalent of 1,3-dihydro-1-methyl-5-phenyl-7-(ethylsulfamoyl)-2H-1,4-benzodiazepin-2-one in methanol and adding dropwise propyl iodide and separately aqueous sodium hydroxide can yield 1,3-dihydro-1-methyl-5-phenyl-7-(ethylpropylsulfamoyl)-2H-1,4-benzodiazepin-2-one.

Other trialkyl products which can be produced as in example 31 include:

1,3-dihydro-1-methyl-5-phenyl-7-(methylbutylsulfamoyl)-2H-1,4-benzodiazepin-2-one;

1,3-dihydro-1-methyl-5-phenyl-7-(methylisobutyl-sulfamoyl)-2H-1,4-benzodiazepin-2-one;

1,3-dihydro-1-ethyl-5-phenyl-7-(propylbutylsulfamoyl)-2H-1,4-benzodiazepin-2-one;

1,3-dihydro-1-propyl-5-phenyl-7-(ethylisopropyl-sulfamoyl)-2H-1,4-benzodiazepin-2-one;

1,3-dihydro-1-isopropyl-5-phenyl-7-(methylpropyl-sulfamoyl)-2H-1,4-benzodiazepin-2-one;

1,3-dihydro-1-isobutyl-5-phenyl-7-(methylethylsulfamoyl)-2H-1,4-benzodiazepin-2-one;

1,3-dihydro-1-ethyl-5-phenyl-7-ethylbutylsulfamoyl)-2H-1;4-benzodiazepin-2-one;

1,3-dihydro-1-propyl-5-phenyl-7-(ethylpropylsulfamoyl)-2H-1,4-benzodiazepin-2-one;

1,3-dihydro-1-propyl-5-phenyl-7-(propylisobutyl-sulfamoyl)-2H-1,4-benzodiazepin-2-one;

1,3-dihydro-1-methyl-5-phenyl-7-(isopropylisobutyl-sulfamoyl)-2H-1,4-benzodiazepin-2-one;

1,3-dihydro-1-methyl-5-phenyl-7-(methylisobutyl-sulfamoyl)-2H-1,4-benzodiazepin-2-one; and the like.

I claim:

1. A 1H-1,4-benzodiazepinesulfonamide of the formula VI;

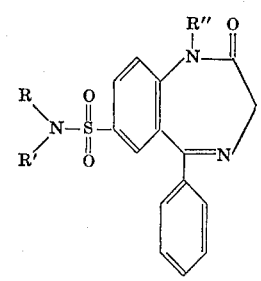

VI wherein R, R' and R'' are selected from the group consisting of hydrogen and alkyl of one to four carbon atoms, inclusive.

2. The compound according to claim 1 wherein R, R' and R'' are hydrogen and the compound is therefore 1,3-dihydro-5-phenyl-7-sulfamoyl-2H-1,4-benzodiazepin-2-one.

3. The compound according to claim 1 wherein R and R' are methyl and R'' is hydrogen and the compound is therefore 1,3-dihydro-5-phenyl-7-(dimethylsulfamoyl)-2H-1,4-benzodiazepin-2-one.

UNITED STATES PATENT OFFICE
CERTIFICATE OF CORRECTION

Patent No. 3,609,145      Dated September 28, 1971

Inventor(s) Robert B. Moffett

It is certified that error appears in the above-identified patent and that said Letters Patent are hereby corrected as shown below:

Column 1, line 71, for "propyl isopropyl," read -- propyl, isopropyl --. Column 2, Formula VIII, should read as shown below instead of as in the patent:

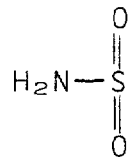

Column 3, line 11: for "1 1 to 1 1.2," read -- 1:1 to 1:1.2 --. Column 4, line 45, for "(7 mole)" read -- (0.1 mole) --. Column 5, line 14, for "$C_{15}H_{13}N_3O_3O_3S$:" read -- $C_{15}H_{13}N_3O_3S$: --. Column 6, line 53, for "dizepine" read -- diazepine --; line 74, for "material 2-amino" read -- material [2-amino --. Column 7, line 49, for "enzophenone" read -- benzophenone --; line 75, for "diethyl" read -- (diethyl --. Column 9, line 18, for "5 sulfamoyl" read -- 5-sulfamoyl --; line 33, for "7 sulfamoyl" read -- 7-sulfamoyl --. Column 10, line 42, for "7-ethyl" read -- 7-(ethyl --.

Signed and sealed this 9th day of May 1972.

(SEAL)
Attest:

EDWARD M. FLETCHER, JR.      ROBERT GOTTSCHALK
Attesting Officer      Commissioner of Patents